Figure 1:
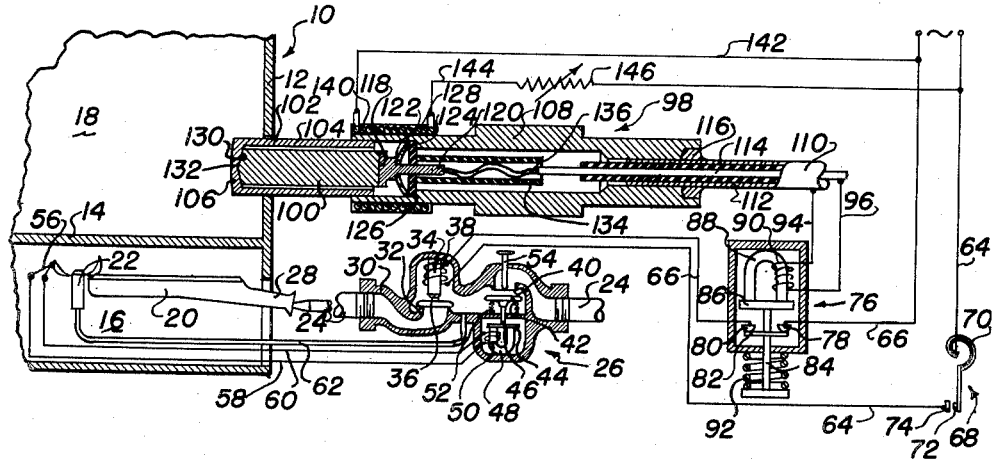

Jan. 24, 1961     R. B. MATTHEWS     2,969,224
TEMPERATURE RESPONSIVE CONTROL APPARATUS
Filed Feb. 12, 1957     2 Sheets-Sheet 1

INVENTOR.
Russell B. Matthews
BY
Seegert & Schwalbach
Att'ys

INVENTOR.
Russell B. Matthews

United States Patent Office  2,969,224
Patented Jan. 24, 1961

2,969,224

TEMPERATURE RESPONSIVE CONTROL APPARATUS

Russell B. Matthews, Wauwatosa, Wis., assignor to Baso Inc., Milwaukee, Wis., a corporation of Wisconsin Filed Feb. 12, 1957, Ser. No. 639,747

6 Claims. (Cl. 257—286)

This invention relates to temperature responsive control apparatus and more particularly to apparatus including thermoelectric generator means for sensing temperature.

More specifically, the present invention pertains to temperature sensitive electroresponsive control means for control of means for varying the temperature within a given enclosure, such as a room or building, and wherein the control means includes thermoelectric generator means having a portion exposed to temperature variations afforded by such temperature varying means to afford control of the latter in response to predetermined temperature variations.

Therefore, it is an object of this invention to provide temperature responsive control apparatus having thermoelectric generator means for sensing variations from a predetermined temperature.

Another object is to provide temperature responsive control apparatus comprising a thermoelectric generator having one of its thermojunctions exposed to temperature variations afforded by temperature varying means and the other of its thermojunctions at a substantially constant temperature, said control apparatus including control means responsive to a predetermined value of electrical energy afforded by said generator to effect operation of said temperature varying means and means affording a predetermined temperature difference between said junctions to effect energization of said control means, when a predetermined change in temperature by said temperature varying means decreases said temperature difference to cause said control means to render said temperature varying means inoperative.

Another object is the provision of temperature responsive control apparatus as characterized above wherein the thermoelectric generator is incapable of affording further energization for operation of said temperature varying means whenever the latter causes the temperature of the first thermocouple junction to approach the temperature of the second thermocouple junction.

Another object is the provision of temperature responsive control apparatus as characterized above which is fail-safe by virtue of the requirement of satisfactory operation of the generator and the means for affording the predetermined temperature difference between the thermojunctions before the temperature varying means can be operated.

Another object is to provide temperature responsive control apparatus as characterized above wherein the thermoelectric generator comprises at least one semi-metallic element.

Another object is to provide temperature responsive control apparatus as characterized above having safety shut-off means responsive to the energy generated by said thermoelectric generator to afford shut off of the temperature varying means whenever an unsafe temperature obtains.

Another object is to provide temperature responsive control apparatus as characterized above wherein the safety shut-off means is of the manually resettable type.

Another object is to provide temperature responsive control apparatus as characterized above wherein electric heating means is employed for maintaining the second thermocouple junction at a constant temperature, there also being means for adjusting the temperature afforded said second junction by said heating means to permit of adjusting the control temperature of said temperature varying means.

Another object of this invention is to provide temperature responsive control apparatus comprising thermoelectric generator means for sensing the presence of either a predetermined high or a predetermined low temperature.

Another object is to provide temperature responsive control apparatus as characterized above, wherein two thermoelectric generators are employed, one of such generators being responsive to a predetermined high temperature and the other of such generators being responsive to a predetermined low temperature, there being temperature varying means under control of said generators for providing either heating or cooling as desired.

Another object is the provision of temperature responsive control apparatus as characterized above comprising means for selecting a temperature higher or lower than ambient to be maintained by the temperature varying means.

Another object is to provide temperature responsive control apparatus as characterized above including means for varying the predetermined temperature provided at the thermojunctions of the thermoelectric generator in accordance with temperature variations other than temperature variations effected by the temperature varying means.

Figure 2:
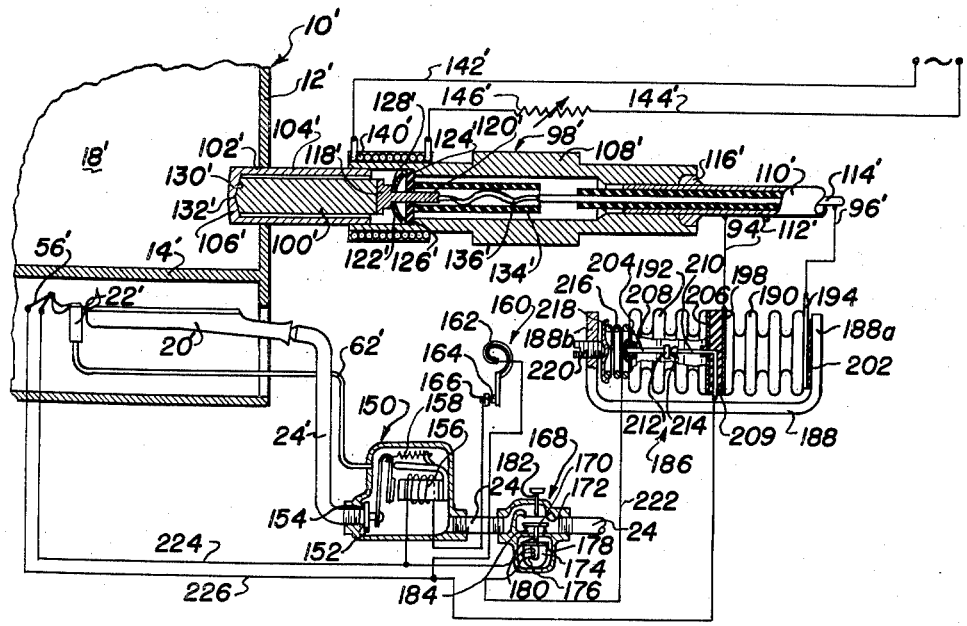
Figure 3:
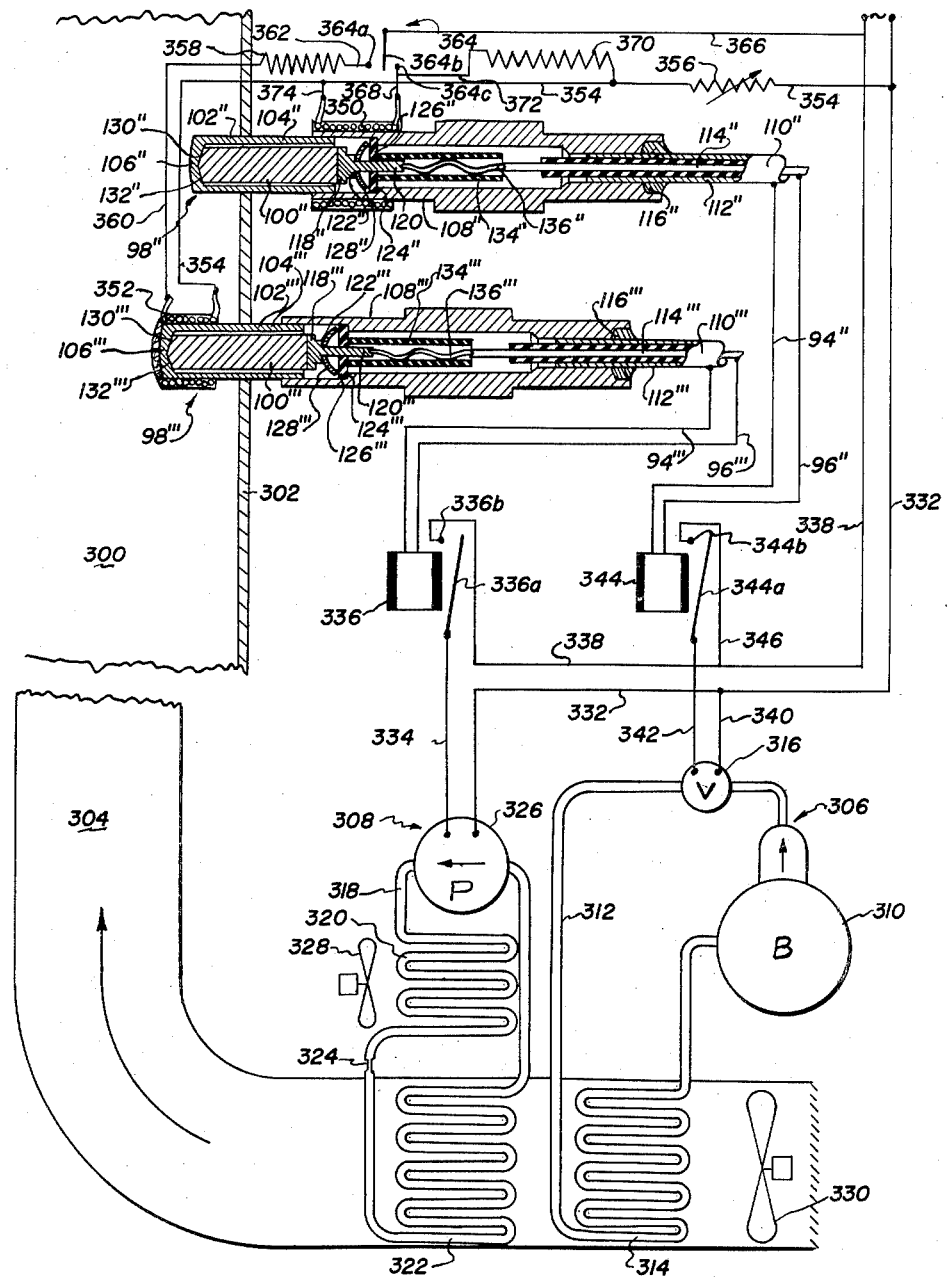

The novel features which I consider characteristic of my invention are set forth with particularity in the appended claims. The device, itself, however, both as to its organization and mode of operation, together with additional objects and advantages thereof, will best be understood from the following description of specific embodiments when read in connection with the accompanying drawings, in which:

Figure 1 is more or less a schematic showing of a first embodiment of the present invention with some of the components shown in section, Figure 2 is a similar showing of a second embodiment of the present invention, and Figure 3 is a similar showing of a third embodiment of the present invention.

Referring to Figure 1 of the drawings, it shows a heating unit 10 comprising a sheet metal enclosure 12, having a partition wall 14 affording separation of a combustion chamber 16 and bonnet or plenum chamber 18. Positioned within combustion chamber 16 is a main fuel burner 20 and an ignition or pilot fuel burner 22 therefor. A main fuel supply conduit 24 having fuel flow control of pilot burner 22 and fuel flow control of main burner 20 through a mixing chamber 28.

Flow control means 26 comprises a valve body 30 formed with a valve seat 32. An electroresponsive valve or flow control device 34 having a valve member 36 for cooperation with valve seat 32 and an energizing coil 38 energizable for actuating valve member 36 to its flow-permitting position is provided within valve body 30. Valve member 36 is returned to flow-preventing position by gravity, or valve device 34 may be provided with a return spring (not shown) for returning valve member 36 to its flow-preventing position upon deenergization of coil 38.

Valve body 30 is further formed with a valve seat 40 upstream of valve seat 32, there being safety shut-off means comprising a valve member 42 connected to a movable armature 44 by means of a valve stem 46 and a stationary magnet member 48 having an electromagnet winding 50 for controlling fuel flow through valve seat 40. Valve member 42 is biased toward its flow-preventing position with respect to seat 40 by means of a compression spring 52, a manually operable reset stem 54 being slidably positioned within a wall of valve body 30 for moving valve member 42 to its flow-permitting position and armature member 44 into engagement with magnet member 48, as is well known in the art. A thermoelectric generator or thermocouple 56 positioned adjacent pilot burner 22 for heating thereby is connected in circuit with winding 50 by means of lead wires 58 and 60. A pilot fuel supply conduit 62 affords fuel flow to pilot burner 22 from valve body 30 whenever valve member 42 is in its flow-permitting position.

Energizing coil 38 of valve device 34 is connected to a source of electrical energy by lead wires 64 and 66. Interposed in lead wire 64 is a temperature responsive circuit controlling device 68 comprising a bimetal element 70 carrying a movable contact 72 for cooperation with a stationary contact 74. As is well understood in the art, bimetal element 70 of switch 68 is deformable with changes in temperature to effect circuit making and circuit breaking cooperation of contacts 70 and 74.

Connected in lead wire 66 is a manually resettable circuit controlling device 76 comprising stationary contacts 78 and 80 and a movable contact member or shorting bar 82 fixed to reset stem 84. Stem 84 carries a movable armature 86 which cooperates with a magnet member 88 adapted with an electromagnet winding 90. A compression spring 92 is provided to bias movable contact member 82 to separated position with respect to stationary contacts 78 and 80 and armature member 86 to separated or unattracted position with respect to magnet member 88.

Connected in circuit with winding 90, by means of lead wires 94 and 96, is a thermoelectric generator or thermocouple 98. Thermocouple 98 is disposed within a suitable opening formed in a side wall of enclosure 12 to position one of its thermocouple junctions within plenum chamber 18 and another of its thermocouple junctions outside thereof. Generator 98 comprises a pair of thermocouple element means 100 and 102, the latter of which takes the form of an elongated, generally cup-shaped sheath member, preferably of stainless steel. The sheath 102 has a tubular sleeve portion 104 and a tip portion 106. The opposite end of member 102 is telescopically received within a counterbore formed in one end of an extension tube 108 of brass or other suitable material, and is sealingly fixed therein as by silver soldering or brazing. The other end of tube 108 is formed with a portion of reduced diameter to snugly receive one end of a coaxial type thermoelectric generator lead 110 comprising a metallic tubular outer conductor 112 and an insulated coaxial inner conductor 114. The sleeve 108 has an end recess adjacent the lead 110, and said tube and lead are sealingly and electrically connected, for example, by silver soldering or brazing at 116. The thermocouple element means 100 preferably comprises a rod-like or cylindrical ingot of semi-metallic alloy or composition disposed in coaxial spaced relation within the sheath 102. Because the thermocouple element means 100 is of frangible material, the generator 98 is constructed in a manner to provide shock resistant mounting means therefor. The element 100 includes a contact electrode 118 having a stem portion 120 and a shoulder 122. The tube 108 is formed with an internal annular shoulder 124 and surrounding the contact electrode stem portion 120 is an insulating washer 126 engaging the shoulder 124. Interposed between the insulating washer 126 and the stem shoulder 122 is a compression spring 128 which may take the form of a concavo-convex centrally apertured resilient disc also surrounding the electrode stem 120. The sheath 102 is formed with a conical inner end wall 130, and the semi-metallic element 100 is formed with a complementary conical end wall 132 which is seated against the end wall 130. The spring 128 exerts compressive stresses on the element 100, which stresses substantially reduce the net tensile stresses to which said element is subjected during transverse acceleration or shock, said compressive stresses not being so high as to exceed the compressive strength of said element. The bias of the spring 128 also provides the pressure necessary for satisfactory pressure contact between the element 100 and the sheath 102 at the surfaces 130 and 132 to provide the thermocouple junction positioned within plenum chamber 18. The pressure type contact is not deleteriously affected by deformation of the element 100, for example, on bending under transverse shock, and the conical nature of the surfaces 130 and 132 tends to maintain the semi-metallic element 100 in centered relationship within the tubular portion 104 of the member 102. The compressive stress under which the member 100 is placed increases the magnitude of deformation which said element can withstand without fracture and affords the generator 98 substantial shock resistance.

A tube 134 of insulating material preferably surrounds the contact electrode stem 120, and a flexible conductor 136 extends within the tube 134 and affords an electrical connection between the stem 120 and the inner conductor 114 of the coaxial lead 110.

The thermocouple element 100 may, for example, be formed of an alloy further described in Sebastian Karrer Patent No. 2,811,570.

Mechanical and electrical contact between the thermocouple element 102 and the semi-metallic thermocouple element 100 is made over a substantial area by the pressure contact between the surfaces 130 and 132. Contact with the opposite end of the element 100 is made over a substantial area thereof to the contact electrode 118. Contact electrodes provide contacts of low thermal and electric resistance, and are chemically stable with respect to the element 100.

It will be noted that when the tip 106 of the sheath 102 is heated, the element 100 is free to expand and the flexible conductor 136 maintains continuity of the electrical circuit between the electrode 118 and the lead conductor 114 while at the same time affording means for isolating said electrode and the element 100 from external forces which might be applied to the lead 110.

Heating means which may take the form of a coil 140 of electrical resistance material is associated with thermoelectric generator 98 in close proximity to the aforementioned cold junctions of generator 98 to initially provide a temperature difference between the hot and cold junctions of the latter to effect sufficient energization of electromagnet winding 90 to retain armature 86 in attracted position with respect to magnet member 88, when moved thereto, as will hereinafter be apparent. A lead wire 142 affords connection of one end of heating coil 140 with lead wire 66, while the other end of coil 140 is connected to lead wire 64 by means of a lead wire 144 having an adjustable current limiting resistor 146 for varying the heat generated by coil 140.

The operation of the first embodiment of the present invention will now be described:

In order to effect ignition of main burner 20, it is first necessary to manually depress reset stem 54 for movement of valve member 42 to its flow-permitting position to allow fluid fuel to flow through conduit 62 to pilot burner 22. The fuel thus emitted at pilot burner 22 may be ignited in any desired manner. Such resetting operation also moves armature member 44 from unattracted to attracted position with respect to magnet member 48. Sufficient heating of thermocouple 56 by pilot burner 22 effects energization of winding 50 on magnet member 48 for retention of valve member 42 in its flow-permitting position against the force of return spring 52. When this condition prevails, reset stem 54 may be released and pilot burner 22 will remain ignited.

The next step necessary in igniting main burner 20 is to manually move reset stem 84 of switch 76 to cause contact member 82 to electrically bridge stationary contacts 78 and 80. Such movement of stem 84 also moves armature member 86 from unattracted to attracted position with respect to magnet member 88 to hold contact member 82 in engagement with contacts 78 and 80 in response to energization of winding 90 by generator 98 as will hereinafter appear.

With plenum chamber 18 at or near ambient temperature due to extinguishment of main burner 20, the thermocouple hot junction between element 100 and sheath 102 is at a substantially lower temperature than the temperature afforded the cold junctions between element 100 and electrode 118 and between sheath 102 and tube 108 due to energization of heating coil 140. Such temperature differential between the hot and cold junctions causes generator 98 to afford sufficient current flow through winding 90 to magnetically retain armature member 86 in its attracted position against the force of spring 92. Under these conditions, contact member 82 is retained in bridging engagement with stationary contacts 78 and 80, wherefore coil 38 of valve device 34 is energized and deenergized in accordance with operation of temperature responsive circuit controlling device 68. Energization of coil 38 causes valve member 36 to be moved to its flow-permitting position to permit fuel flow to main burner 20 through valve seats 40 and 32 and main fuel conduit 24 whereas deenergization of coil 38 permits valve member 36 to return to its flow-preventing position. As is well understood in the art, fluid fuel emitted at main burner 20 is ignited by the flame at pilot burner 22. Although device 68 may be responsive to any desired temperature condition, I prefer to employ device 68 as a thermostatic switch positioned within an enclosure, such as a room or building, the temperature of which is to be maintained substantially constant.

In this manner, main burner 20 affords heating and permits cooling of the air within plenum chamber 18 in accordance with temperature conditions within the space being supplied heat from chamber 18. During such operation contact member 82 remains in bridging engagement with stationary contacts 78 and 80 since the temperature differential between the aforedescribed hot and cold junctions of generator 98 is at all times sufficient to effect energization of winding 90 above the drop-out value thereof. However, if excessive heating should take place within plenum chamber 18 as by continuous burning of fuel at main burner 20 due to faulty operation of temperature responsive circuit controlling device 68, the temperature of the hot junction of generator 98 will increase accordingly until the temperature differential between the hot and cold junctions is reduced to a point where the electrical energy output of generator 98 is below the predetermined minimum value necessary for causing magnet member 88 to retain armature 86 in its attracted position against the force of spring 92. In this event, spring 92 takes over and returns contact member 82 to open circuit position with respect to stationary contacts 78 and 80, whereupon coil 38 of valve device 34 is immediately deenergized and valve member 36 is returned to its flow-preventing position in engagement with valve seat 32. Although such operation has no effect on ignition burner 22, it is necessary to manually reset armature 86 to its attracted position with respect to magnet member 88 in order to reignite main burner 20.

Should it be desired to change the plenum chamber temperature necessary to permit spring 92 to move contact member 82 to open circuit position with respect to stationary contacts 78 and 80, it is merely necessary to make suitable adjustment of current limiting resistor 146 to thereby change the artificial temperature applied to the cold junctions of generator 98 by heating coil 140.

The embodiment of the invention shown in Figure 2 is shown in conjunction with a self-generating system and comprises many of the same components shown in Figure 1 and hereinbefore described. Such components are identified in Figure 2 with the Figure 1 numerals primed and will not now be described in detail since reference may be had to the description of Figure 1 for such information.

Referring to Figure 2 of the drawings, it shows a flow-control device 150 comprising a valve member 152 for cooperation with a valve seat 154 for control of fuel flow to main burner 20. Control device 150 further comprises an electromagnetic operator having an electromagnet winding 156 energizable to move valve member 152 to flow-permitting position against the biasing force of a tension spring 158 and deenergizable to permit spring 158 to return valve member 152 to its flow-preventing position.

A condition responsive circuit controlling device 160 having a bimetal element 162 and cooperating electrical contacts 164 and 166 is connected in series circuit arrangement with energizing coil 156 of flow-control device 150 as shown in the drawings.

A safety shut-off device 168 having a valve member 170 for flow-controlling cooperation with a valve seat 172 is also provided in main fuel conduit 24'. Device 168 comprises a magnet member 174 adapted with an electromagnet winding 176, and an armature 178 for cooperation with magnet member 174 and fixed relative to valve member 170 by means of a valve stem 180. A reset stem 182 is provided for moving valve member 170 to its flow-permitting position and armature member 178 to its attracted position against the biasing force of a compression spring 184.

In circuit with electromagnet winding 176 of safety shut-off device 168 is a temperature responsive circuit controlling device 186 comprising a switch base 188 formed with upturned end portions 188a and 188b affording a generally U-shaped bracket, and hermetically sealed enclosures or bellows 190 and 192, each of which has a subatmospheric volatile fluid fill. Bellows 190, of electrical resistance material, comprises a stationary end wall 194 and a movable end wall 198. Interposed between stationary end wall 194 and upturned end portion 188a of base 188, is electrical insulating means 202.

Bellows 192 is formed with oppositely disposed movable end walls 204 and 206, there being electrical insulating means 209 interposed between movable end wall 198 of bellows 190 and movable end wall 206 of bellows 192. Insulatedly fixed relative to end walls 202 and 206, respectively, are contact carriers 208 and 210 having cooperating electrical contacts 212 and 214 respectively. As shown in Figure 2, contact carrier 210 extends through insulating means 209 to provide terminal means external of bellows 192.

Asjustable biasing means for bellows 190 and 192 is provided between end wall 204 of bellows 192 and the upturned end portion 188b of bracket 188. Such biasing means comprises a compression spring 216 having one end in abutting engagement with end wall 204 and another end positioned within a spring retainer 218. An adjusting screw 220 threadably positioned within a suitable opening formed in end portion 188b of bracket 188, has abutting engagement with spring retainer 218 and is provided with a screw driver kerf to facilitate adjustment of the biasing force of spring 216 on bellows 190 and 192.

Thermoelectric generator 98', similar to the thermoelectric generator 98 above described in detail with reference to Figure 1, is provided in circuit with bellows 190 by interconnection of movable end wall 198 and lead wire 94' and interconnection of stationary end wall 194 and lead wire 96'. Generator 98' is constructed in the same manner as above explained and is positioned with respect to enclosure 12' and plenum chamber 18' in the same manner as explained above with reference to Figure 1. Also, generator 98' of Figure 2 is provided with a similar heating coil 140' for energization from a source of electrical energy (not shown) through lead wires 142' and 144', and an adjustable current limiting resistor 146'.

A lead wire 222 affords connection of contact carrier 208 with one end of electromagnet winding 176 of safety shut-off device 168. The other end of winding 176 is connected by a lead wire 224 to one side of thermocouple 56', the other side of thermocouple 56' being connected to contact carrier 210 by means of a lead wire 226. The series circuit comprising energizing coil 156 of flow-control device 150 and the condition responsive circuit controlling device 160 is connected across lead wires 224 and 226 for energization, by thermocouple 56', in parallel circuit arrangement with electromagnet winding 176 and circuit controlling device 186.

The operation of the embodiment shown in Figure 2 will now be described:

In order to effect ignition of main burner 20', it is first necessary to manually depress reset stem 182 of safety shut-off device 168 to effect movement of valve member 170 to flow-permitting position and armature member 178 to attracted position relative to magnet member 174. Such movement of valve member 170 permits fluid fuel to flow to pilot burner 22' through valve seat 172, a portion of conduit 24' and pilot fuel supply conduit 62'. The fuel thus emitted at pilot burner 22' may be ignited in any desired manner. Ignition of pilot burner 22' effects heating of the hot junction of thermocouple 56' to afford current flow through the serially arranged energizing winding 176 of flow-control device 168 and cooperating contacts 212 and 214 of condition responsive circuit controlling device 186. Such current flow through energizing winding 176 affords magnetic flux flow in magnetic member 174 and armature member 178 to retain valve member 170 in flow-permitting position against the biasing force of compression spring 184.

Electrical contacts 212 and 214 are usually in engagement at this time due to expansion of the volatile fluid fill within bellows 190 as effected by the heat afforded by current flow through the electrically resistant wall of bellows 190. As above explained with reference to operation of the embodiment shown in Figure 1, energization of heating coil 140' through lead wires 142' and 144', places the cold junctions of thermocouple 98' at a substantially higher temperature than the hot junction thereof. Such temperature differential causes generator 98' to provide sufficient current flow through heating means combining the electrically resistant side wall of bellows 190, from lead wire 96' to lead wire 94', to effect substantial heating and hence expansion of the fluid fill of bellows 190. Such expansion causes electrical contact 214 to be moved into engagement with electrical contact 212.

With thermoelectric generator 56' affording sufficient current flow to retain safety shut-off valve member 170 in flow-permitting position, circuit completing engagement of contacts 164 and 166, as by response of circuit controlling device 160 to a decrease in temperature, effects energization of coil 156 of flow-control device 150 by thermoelectric generator 56'. As above explained, energization of coil 156 effects movement of valve member 152 to flow-permitting position against the biasing force of tension spring 158. In this manner, fuel is permitted to flow through conduit 24' to main burner 20' where it is ignited by the flame at pilot burner 22'.

A predetermined increase in temperature about circuit controlling device 160, effects disengagement of contacts 164 and 166 and interruption of the energizing circuit for coil 156. In this event, biasing spring 158 returns valve member 152 to its flow-preventing position, thereby interrupting fuel flow to main burner 20'. In this manner, ignition of main burner 20' is controlled in accordance with temperature variations at circuit controlling device 160. I prefer to position circuit controlling device 160 in the space to be heated by main burner 20' to afford thermostatic control.

However, if excessive heating takes place within plenum chamber 18' as by continuous burning of fuel at main burner 20' due to faulty operation of device 160, the temperature of the hot junction of generator 98' increases accordingly until the temperature differential between the hot and cold junctions is reduced to a point where the electrical energy output of generator 98' is insufficient to retain contacts 212 and 214 in engagement against the inherent expansive biasing force of bellows 192. That is, as the current flow through the side wall of bellows 190 decreases, the heat generated within the bellows 190 also decreases, causing contraction of the fluid fill therewithin. In this event, the inherent biasing force of bellows 192 effects separation of contacts 212 and 214 for interruption of the energizing circuit of winding 176 of safety shut-off device 168. Deenergization of winding 176 permits spring 184 to return valve member 170 to its flow-preventing position for interruption of fuel flow to both the main and pilot burners. Should it be desired to reignite main burner 20', it is necessary to again depress reset stem 182 for reignition of pilot burner 22' as hereinbefore set forth.

The construction of circuit controlling device 186 shown in Figure 2, is particularly desirable since it is operatively independent of changes in ambient temperature. That is, any change in ambient temperature which might effect expansion or contraction of the volatile fluid fill within bellows 190, will have an identical effect on the fluid fill of bellows 192. Since the forces resulting from such expansion or contraction will be equal in magnitude but opposite in direction, they will cancel each other and have negligible effect on the relative positions of contacts 212 and 214.

Should it be desired to alter the plenum chamber temperature which effects separation of contacts 212 and 214, it is merely necessary to effect suitable adjustment of screw 220. Such adjustment changes the biasing force of spring 216 on both bellows 190 and bellows 192 to effect a change in the temperature differential necessary between the hot and cold junctions of generator 98' to afford disengagement of contacts 212 and 214. Also, such actuating temperature may be changed as desired by making suitable adjustment of current limiting resistor 146' to thereby change the artificial temperature applied to the cold junctions of generator 98' by heating coil 140'.

The embodiment of the invention shown in Figure 3 comprises many of the same components shown in Figures 1 and 2. Such components are identified in Figure 3 with the Figure 1 numerals double primed and triple primed and will not now be described in detail since reference may be had to the description of Figure 1 for such information.

Referring to Figure 3, it shows an enclosure 300 having a side wall 302 and an air duct or conduit 304 for communication with the interior of enclosure 300. Associated with conduit 304 are temperature varying means 306 and 308 of any suitable type. Temperature varying means 306 constitutes a heating unit for increasing the temperature of the air within conduit 304, and may comprise a boiler 310 associated with suitable heating apparatus (not shown). Fluid conduit means 312 is provided for circulation of heated water or other fluid from boiler 310; said conduit means 312 being formed as heating coils 314 positioned within conduit 304. A flow-control valve 316 is operatively associated with conduit 312 for control of the flow of heated fluid to coils 314. The particular temperature increasing means 306 shown in the drawings and described herein is merely to illustrate the present invention and is not an essential element thereof. Rather, temperature increasing means 306 may take any desired form such as the hot air systems known in the heating art and employing a fluid fuel burner positioned within or associated with conduit 304 to afford heating of the air therewithin. In like manner, the appended claims are not to be restricted to any particular form of temperature varying means but rather are intended to encompass all devices or apparatus which come within their terms.

Temperature varying means 308 constitutes temperature decreasing means for lowering the temperature of the air within conduit 304. Means 308 may take the form of a refrigerating unit, as shown, which comprises a fluid conduit 318 filled with refrigerant fluid and which is formed with coils 320 to provide a heat exchanger portion and coils 322 to provide an evaporator portion. An expansion valve 324 is positioned in conduit 318 between heat exchanger 320 and evaporator 322. Operatively positioned in conduit 318, is a fluid pump or compressor 326 for circulating the refrigerant fluid as is well understood in the art. A fan 328 is disposed adjacent heat exchanger unit 320 and is operable to aid in removing heat from the fluid refrigerant.

A fan 330 is positioned within conduit 304 for forcing or pushing the air within conduit 304 into enclosure 300 for varying the temperature of the air within the latter.

A lead wire 332 affords connection of one side of pump 326 with a source of electrical power (not shown), while another lead wire 334 affords connection of the other side of pump 326 with a movable contact member 336a of an electroresponsive circuit controlling device or normally open relay 336. A lead wire 338 affords connection of a stationary contact 336b of relay 336 with the other side of aforementioned source of electrical power.

Affording connection of one side of electroresponsive valve 316 with lead wire 332 is a lead wire 340. Another lead wire 342 affords connection of the other side of valve 316 with a movable contact 344a of an electroresponsive circuit controlling device or normally open relay 344. A lead wire 346 affords connection of a stationary contact 344b of relay 344 with the aforementioned lead wire 338.

Lead wires 94″ and 96″ afford connection of the inner and outer conductors 114″ and 112″, respectively, of the coaxial lead 110″ of thermoelectric generator 98′ with relay 344. Lead wires 94‴ and 96‴ are provided to afford connection of relay 336 with the inner and outer conductors 114‴ and 112‴, respectively, of the coaxial lead 110‴ associated with generator 98‴.

Heating means which may take the form of an electric heating coil 350 is associated with thermoelectric generator 98″ externally of said enclosure 300 and in close proximity to the aforementioned cold junctions of generator 98″. Thermoelectric generator 98‴ is also provided with heating means such as electric heating coil 352 which is positioned on the hot junction of generator 98‴. A lead wire 354 affords connection of one end of heating coil 352 with lead wire 332, there being an adjustable resistor 356 interposed in lead wire 354. The other end of coil 112 is connected to one end of a thermistor 358 by means of a lead wire 360. The other end of the thermistor 358 is connected, by means of a lead wire 362, to a stationary contact 364a of a manually operable single-pole double-throw circuit controlling device 364. Circuit controlling device 364 comprises an electrical pole member 364b for engagement alternatively with contact 364a and another stationary contact 364c. Electrical pole member 364b is connected to lead wire 338 by means of a lead wire 366.

Stationary contact 364c is connected to one end of heating coil 350 by a lead wire 368 and to one end of a thermistor 370 by a lead wire 372 connected to lead wire 368. The other end of thermistor 370 is connected to lead wire 354 while the other end of heating coil 350 is afforded connection with said wire 354 by means of a lead wire 374.

The operation of the third embodiment of the present invention will now be described:

In order to afford regulation and control of the temperature within enclosure 300, it is first necessary to move electrical pole member 364b, of manually operable switch 364, into engagement with one or the other of stationary contacts 364a and 364c. Should it be desired to increase the temperature within enclosure 300 for maintaining such temperature at a higher level than the ambient temperature, it is necessary to move pole member 364b into engagement with stationary contact 364c for energization of heating coil 350 of thermoelectric generator 98″. Such energization is afforded from a source of electrical power (not shown) through a portion of lead wire 338, lead wire 366, pole member 364b, lead wire 368, coil 350, lead wire 374, a portion of lead wire 354 including adjustable resistor 356, and a portion of lead wire 332. It will be noted that such positioning of pole member 364b also affords current flow through thermistor 370 in parallel circuit arrangement with coil 350. Energization of coil 350 affords heating of the cold junctions afforded by the junctures of members 100″ and 118″, and members 102″ and 109″ of generator 98″, but has no effect on the temperature of the hot junction thereof due to the heat insulating effect of enclosure wall 302. Conversely, any variation in the temperature of the hot junction afforded by the juncture of faces 130″ and 132″ of elements 102″ and 100″, as will hereinafter appear, has substantially no effect on the temperature of the cold junctions.

Such heating of the cold junctions of generator 98″ provides a temperature differential between the hot and cold junctions thereof to cause sufficient current flow through relay 344, by means of lead wires 94″ and 96″, for effecting attractive movement of contact member 344a into engagement with stationary contact 344b. I prefer to utilize an electromagnetically operated relay 344 which is responsive to energization above a given level to afford movement of contact member 344a into engagement with contact member 344b and responsive to energization below a predetermined level to effect separation of contacts 344a and 344b.

Electrical engagement of said contacts 344a and 344b effects energization of electroresponsive valve device 316 through a circuit comprising a portion of lead wire 338, lead wire 346, contact member 344a, lead wire 342, valve device 316, lead wire 340, and a portion of lead wire 332. Such energization of valve device 316 permits the heated fluid within boiler 310 to flow through conduit 312 including heating coil 314. In this manner, the air within conduit 304 surrounding coil 314 is heated, such heated air being pushed or forced through conduit 304 and into enclosure 300 by fan 330. Heating of the air within enclosure 300 continues until the hot junction of generator 98″, positioned within enclosure 300, reaches a predetermined temperature such that the temperature differential between the hot and cold junctions decreases to a point that renders generator 98″ incapable of energizing relay 344 sufficiently to hold contact member 344a in engagement with stationary contact 344b. When this point is reached, valve device 316 is immediately deenergized for interruption of flow of the heated fluid to coil 314. Such operation of valve device 316 prevents further heating of the air within conduit 304 and enclosure 300.

Subsequent cooling of the air within enclosure 300 decreases the temperature of the hot junction of generator 98″, whereupon the temperature differential between the hot and cold junctions necessary to afford sufficient energization of relay 344 for pull-in of contact member 344a, is again reestablished. In this manner, valve device 316 is reenergized for heating of the air within enclosure 300 as aforedescribed. With contact member 364b of switch 364 in engagement with stationary contact 364c, valve device 316 is alternately energized and deenergized in accordance with the temperature differential of the hot and cold junctions of generator 98″ so as to maintain the temperature within enclosure 300 substantially constant.

Should it be desired to alter the higher than ambient temperature to be maintained within enclosure 300, it is merely necessary to effect suitable adjustment of the current limiting resistor 356 to alter the temperature differential between the hot and cold junctions of the generator 98″. Also in circuit with heating coil 350 is a thermistor 370 for varying current flow through coil 350 in accordance with variation in an outside temperature, as will hereinafter be explained in greater detail as the discussion of the operation of the embodiment of Figure 3 proceeds.

In the event it is desired to decrease the temperature of the air within enclosure 300 so as to maintain therewithin a temperature which is lower than the ambient temperature, it is merely necessary to move contact member 364b into engagement with stationary contact 364a of manually operable switch 364. Positioning of contact member 364b in engagement with contact 364a prevents energization of coil 350 of generator 98″ and effects energization of heating coil 352 of thermoelectric generator 98‴. Such energization is effected through a circuit comprising a portion of lead wire 338, lead wire 366, contact member 364b, lead wire 362, thermistor 358, lead wire 360, coil 352, lead wire 354 including the adjustable current limiting resistor 356, and a portion of lead wire 332. Energization of coil 352 affords heating of the hot junction of generator 98‴ whereby a temperature differential between the hot and cold junctions of generator 98‴ is established to effect sufficient energization of relay 336 to move contact member 336a into engagement with stationary contact 336b. Relay 336, in accordance with the above explanation relative to relay 344, should be of the type which is responsive to energization above a given value to effect pull-in of contact 336a, and which is responsive to energization below a given value to effect drop-out of contact 336a.

Engagement of contacts 336a and 336b effects energization of compressor 326 through lead wire 338, contact member 336a, lead wire 334, pump or compressor 326, and lead wire 332. Energization of compressor 326 affords circulation of the fluid refrigerant within conduit 318, whereby the temperature of cooling coil 322 is reduced by virtue of removal of heat by heat exchanger 320 and fan 328, and expansion of the fluid refrigerant by expansion valve 324. In this manner, the temperature of the air within conduit 304 is decreased and, due to the operation of fan 330, such cooler air is pushed into enclosure 300.

Such decrease in the temperature of the air within enclosure 300 effects cooling of the hot junction of thermoelectric generator 98‴ thereby neutralizing the heating afforded by heating coil 352 at said hot junction. In this manner, the temperature differential between the hot and cold junctions of generator 98‴ is eventually reduced to a point where insufficient current flow is afforded relay 336 by generator 98‴ to maintain contact 336a in engagement with contact 336b. Thus, the energization of compressor 326 is immediately terminated along with further cooling of the air within enclosure 300. Upon predetermined heating of enclosure 300, the aforementioned temperature differential between the hot and cold junctions of generator 98‴ necessary to provide sufficient current flow to relay 336 for pull-in of contact member 336a, is reestablished whereupon the cooling operation, as aforedescribed, again takes place for cooling of the air within enclosure 300. In this manner, the cooling portion of the apparatus shown in the drawing is caused to cycle so as to maintain enclosure 300 at a temperature lower by a predetermined amount than the ambient temperature. Should it be desired to alter the temperature within enclosure 300, it is merely necessary to effect suitable adjustment of the current limiting resistor 356 for alteration of the energization of heating coil 352.

Since it may be desirable to alter the heating or cooling effect within enclosure 300 in accordance with variations in a temperature external thereto, I have provided thermistors 370 and 358, the electrical resistance of which varies inversely with changes in temperature. Although thermistors 370 and 358 may be connected in their respective circuits in any desired manner so as to provide the desired control, I have shown them connected in their respective circuits so as to effect control of the temperature within a room or building in accordance with variations in outdoor temperature. That is, it is often desirable to have the heating unit maintain a higher temperature within the room or building whenever the outside temperature is exceptionally low, and to have the cooling apparatus maintain a lower temperature therewithin whenever the outside temperature is exceptionally high. In order to accomplish this, I propose to position thermistors 370 and 358 outdoors so as to be exposed to the temperature variations afforded by ambient weather conditions.

Thus, with contact member 364b in engagement with stationary contact 364c of manually operable switch 364, a decrease in outdoor temperature effects a corresponding increase in the electrical resistance of thermistor 370, and because of the parallel circuit arrangement of thermistor 370 and coil 350, causes a greater curent flow through heating coil 350 for applying a higher artificial temperature to the cold junctions of generator 98″. In this manner, the heating portion of the disclosed apparatus must raise the temperature within enclosure 300 to a higher value before the temperature differential between the hot and cold junctions of generator 98″ is decreased sufficiently to effect deenergization of valve device 316. Thus, a decrease in outdoor temperature causes the heating apparatus to maintain enclosure 300 at a predetermined higher than usual temperature while an increase in outdoor temperature causes the heating apparatus to maintain enclosure 300 at a predetermined lower than usual temperature.

In like fashion, with movable contact member 364b in engagement with stationary contact 364a of manually operable switch 364, an increase in the outdoor temperature effects a decrease in the electrical resistance of thermistor 358 and due to the series circuit arrangement of thermistor 358 and coil 352, causes a greater current flow through coil 352 for application of a higher artificial temperature to the hot junction of generator 98‴. In this manner, the cooling portion of the disclosed apparatus is required to decrease the temperature of the air within enclosure 300 to a predetermined lower level before the temperature differential between the hot and cold junctions of generator 98‴ is insufficient to maintain contact member 336a in engagement with stationary contact 336b. Thus, an increase in outdoor temperature causes the cooling apparatus to maintain enclosure 300 at a predetermined lower than usual temperature while a decrease in outdoor temperature causes the cooling apparatus to maintain enclosure 300 at a predetermined higher than usual temperature.

It will be noted that the present invention provides a fail-safe arrangement in that the subject apparatus cannot be rendered operable unless the reference junction is maintained at a substantially constant temperature higher than ambient by its associated heating coil. Therefore in the event of power failure, short circuiting, or any other failure, the temperature varying apparatus is shut down. Also, during the operation, any malfunction in the thermoelectric generator or the components associated therewith will render the apparatus inoperative since a predetermined output of the thermoelectric generator is required for initiating and maintaining operation of the apparatus.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The combination with means defining a chamber and first means for heating a medium within said chamber, of control means for said heating means tending to maintain the temperature of said medium at a predetermined first level, said control means comprising a thermoelectric generator having one thermojunction subject to the temperature of said medium and having at least one other thermojunction, electroresponsive control means having a predetermined drop-out electrical energization value in circuit with said generator and in controlling relation with said first heating means, electroresponsive second heating means comprising an electrical resistance type heater in heat transfer relation with said other thermojunction and connected for continuous energization from a source of electrical energy to continuously maintain the temperature of said other thermojunction at a predetermined second level above the ambient temperature external to said chamber, maintenance of said second level at said other thermojunction when said medium temperature is at less than said first level causing said generator to generate electrical energy at least greater than said drop-out value for energization of said electroresponsive control means and operation of said first heating means, operation of said first heating means causing the temperature of said medium and hence of said one thermojunction to approach the temperature of said other thermojunction and to correspondingly reduce the electrical energy output of said generator, such that when the temperature of said medium is at said first level, the output of said generator is below the drop-out value of said control means and the operation of said first heating means is terminated.

2. The combination with means defining a chamber, means for heating a medium within said chamber and means for cooling said medium, of control means for both of said heating and said cooling means comprising a first thermoelectric generator having a first thermojunction subject to the temperature of said medium and having at least one second thermojunction, first electroresponsive control means having a predetermined actuating electrical energization value in circuit with said first generator and in controlling relation with said heating means, a second thermoelectric generator having a third thermojunction subject to the temperature of said medium and having at least one fourth thermojunction, second electroresponsive control means having a predetermined actuating electrical energization value in circuit with said second generator and in controlling relation with said cooling means, first electroresponsive heating means for said second thermojunction tending when energized to maintain the temperature of said second thermojunction at a predetermined level above the ambient temperature external to said chamber, second electroresponsive heating means for said third thermojunction of said second generator tending when energized to maintain the temperature of said third thermojunction at a predetermined level above said ambient temperature, and a selector switch in circuit with both of said thermojunction heating means and with a source of electrical energy, said switch having a first position effecting energization of said first electroresponsive heating means and having a second position effecting energization of said second electroresponsive heating means, said first generator when said selector switch is in its first position being responsive to a temperature within said chamber less than a predetermined temperature above said ambient to effect actuation of said first electroresponsive control means for operation of said medium heating means, and said second generator when said selector switch is in its second position being responsive to a temperature within said chamber above a predetermined temperature below said ambient to effect actuation of said second electroresponsive control means for operation of said medium cooling means.

3. The combination with means defining a chamber, means for heating a medium within said chamber and means for cooling said medium, of control means for both of said heating and said cooling means comprising a first thermoelectric generator having a first thermojunction subject to the temperature of said medium and having at least one second thermojunction, first electroresponsive control means having a predetermined actuating electrical energization value in circuit with said first generator and in controlling relation with said heating means, a second thermoelectric generator having a third thermojunction subject to the temperature of said medium and having at least one fourth thermojunction, second electroresponsive control means having predetermined actuating electrical energization value in circuit with said second generator and in controlling relation with said cooling means, a first electrical resistance type heater for said second thermojunction tending when energized to maintain the temperature of said second thermojunction at a predetermined level above the ambient temperature external to said chamber, a second electrical resistance type heater for said third thermojunction of said second generator tending when energized to maintain the temperature of said third thermojunction at a predetermined level above said ambient temperature, and a selector switch in circuit with both of said heaters and with a source of electrical energy, said switch having a first position effecting energization of said first heater and having a second position effecting energization of said second heater, said first generator when said selector switch is in its first position being responsive to a temperature within said chamber less than a predetermined temperature above said ambient to effect actuation of said first electroresponsive control means for operation of said medium heating means, and said second generator when said selector switch is in its second position being responsive to a temperature within said chamber above a predetermined temperature below said ambient to effect actuation of said second electroresponsive control means for operation of said medium cooling means.

4. The combination with means defining a chamber and first means for heating a medium within said chamber, of control means for said heating means comprising first cycling type control means in circuit with said heating means for cycling the latter in response to variations in the temperature of said medium, and high limit control means comprising a thermoelectric generator having one thermojunction subject to the temperature of said medium and having at least one other thermojunction, electroresponsive control means having a predetermined drop-out electrical energization value in circuit with said generator and in controlling relation with said first heating means, electroresponsive second heating means in heat transfer relation with said other thermojunction and connected for continuous energization from a source of electrical energy to continuously maintain the temperature of said other thermojunction at a predetermined level above the ambient temperature external to said chamber, maintenance of said temperature level at said other thermojunction when said medium temperature is at less than a predetermined high limit temperature causing said generator to generate electrical energy at least greater than said drop-out value for energization of said electroresponsive control means permitting operation of said first heating means under the control of said cycling control means, operation of said heating means causing the temperature of said medium to approach said high limit temperature and thereby causing the temperature of said one thermojunction to approach the temperature of said other thermojunction being operable to correspondingly reduce the electrical energy output of said generator, such that when the temperature of said medium is at said high limit temperature, the output of said generator is below the drop-out value of said control means and the operation of said first heating means is terminated.

5. The combination with means defining a chamber and first means for heating a medium within said chamber, of control means for said heating means comprising first cycling type control means in circuit with said heating means for cycling the latter in response to variations in the temperature of said medium, and high limit control means comprising a thermoelectric generator having one thermojunction subject to the temperature of said medium and having at least one other thermojunction, an electromagnetic relay having a predetermined drop-out electrical energization value in circuit with said generator and having contacts in circuit with said first heating means, electroresponsive second heating means in heat transfer relation with said other thermojunction and connected for continuous energization from a source of electrical energy to continuously maintain the temperature of said other thermojunction at a predetermined level above the ambient temperature external to said chamber, maintenance of said temperature level at said other thermojunction when said medium temperature is at less than a predetermined high limit temperature causing said generator to generate electrical energy at least greater than said drop-out value for energization of said relay to circuit making position permitting operation of said first heating means under the control of said cycling control means, operation of said first heating means causing the temperature of said medium to approach said high limit temperature and thereby causing the temperature of said one thermojunction to approach the temperature of said other thermojunction being operable to correspondingly reduce the electrical energy output of said generator, such that when the temperature of said medium is at said high limit temperature, the output of said generator is below the drop-out value of said relay and the contacts thereof are in circuit interrupting position terminating operation of said first heating means.

6. The combination with means defining a chamber and first means for heating a medium within said chamber, of control means for said heating means comprising first cycling type control means in circuit with said heating means for cycling the latter in response to variations in the temperature of said medium, and high limit control means comprising a thermoelectric generator having one thermojunction subject to the temperature of said medium and having at least one other thermojunction, an electroresponsive thermal relay having a predetermined drop-out electrical energization value in circuit with said generator and having contacts in circuit with said first heating means, electroresponsive second heating means in heat transfer relation with said other thermojunction and connected for continuous energization from a source of electrical energy to continuously maintain the temperature of said other thermojunction at a predetermined level above the ambient temperature external to said chamber, maintenance of said temperature level at said other thermojunction when said medium temperature is at less than a predetermined high limit temperature causing said generator to generate electrical energy at least greater than said drop-out value for energization of said relay to circuit making position permitting operation of said first heating means under the control of said cycling control means, operation of said first heating means causing the temperature of said medium to approach said high limit temperature and thereby causing the temperature of said one thermojunction to approach the temperature of said other thermojunction being operable to correspondingly reduce the electrical energy output of said generator, such that when the temperature of said medium is at said high limit temperature, the output of said generator is below the drop-out value of said relay and the contacts thereof are in circuit interrupting position terminating operation of said first heating means.

References Cited in the file of this patent

UNITED STATES PATENTS

| | | |
|---|---|---|
| 1,685,995 | Gano | Oct. 2, 1928 |
| 1,982,053 | Hodgson | Nov. 27, 1934 |
| 2,201,765 | Euwer | May 21, 1940 |
| 2,340,899 | Ray | Feb. 8, 1944 |
| 2,489,049 | Root | Nov. 22, 1949 |
| 2,509,629 | Degiers | May 30, 1950 |
| 2,710,181 | Parrett | June 7, 1955 |
| 2,720,615 | Betz | Oct. 11, 1955 |
| 2,766,937 | Snavely | Oct. 16, 1956 |
| 2,836,639 | Templin | May 27, 1958 |

UNITED STATES PATENT OFFICE
CERTIFICATE OF CORRECTION

Patent No. 2,969,224 January 24, 1961

Russell B. Matthews

It is hereby certified that error appears in the above numbered patent requiring correction and that the said Letters Patent should read as corrected below.

Column 6, line 57, for "Asjustable" read -- Adjustable --; Column 14, lines 71 and 72 for "said heating means", read -- said first heating means --.

Signed and sealed this 14th day of November 1961.

(SEAL)
Attest:

ERNEST W. SWIDER
Attesting Officer

DAVID L. LADD
Commissioner of Patents

USCOMM-DC

UNITED STATES PATENT OFFICE
CERTIFICATE OF CORRECTION

Patent No. 2,969,224                  January 24, 1961

Russell B. Matthews

It is hereby certified that error appears in the above numbered patent requiring correction and that the said Letters Patent should read as corrected below.

Column 6, line 57, for "Asjustable" read -- Adjustable --; Column 14, lines 71 and 72 for "said heating means", read -- said first heating means --.

Signed and sealed this 14th day of November 1961.

(SEAL)
Attest:

ERNEST W. SWIDER
Attesting Officer

DAVID L. LADD
Commissioner of Patents
USCOMM-DC